(12) United States Patent
Orsatti et al.

(10) Patent No.: US 6,772,371 B1
(45) Date of Patent: Aug. 3, 2004

(54) ON-LINE DEBUGGING SYSTEM IN A SWITCHING NODE OF A DATA TRANSMISSION NETWORK

(75) Inventors: Daniel Orsatti, La Gaude (FR); Dominique Rigal, Nice (FR); Bruno Rousseau, Vence (FR); Jean-Claude Zunino, Nice (FR)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 09/691,511

(22) Filed: Oct. 18, 2000

(30) Foreign Application Priority Data

Oct. 21, 1999 (EP) .............................................. 99480105

(51) Int. Cl.[7] ................................................. G06F 11/00
(52) U.S. Cl. .......................................... 714/34; 714/32
(58) Field of Search ..................................... 714/32, 34

(56) References Cited

U.S. PATENT DOCUMENTS

| | | | | |
|---|---|---|---|---|
| 5,355,468 A | * | 10/1994 | Jeppesen et al. ............... | 714/34 |
| 5,724,348 A | * | 3/1998 | Basso et al. ................. | 370/384 |
| 6,223,305 B1 | * | 4/2001 | Simmons et al. ............. | 714/34 |
| 6,298,394 B1 | * | 10/2001 | Edwards et al. .............. | 710/15 |
| 6,349,371 B1 | * | 2/2002 | Ramanadin et al. ........ | 711/151 |
| 6,389,557 B1 | * | 5/2002 | Yu et al. ....................... | 714/34 |
| 6,550,022 B1 | * | 4/2003 | Faver .......................... | 714/34 |

* cited by examiner

*Primary Examiner*—Robert Beausoliel
*Assistant Examiner*—Emerson Puente
(74) *Attorney, Agent, or Firm*—Daniel E. McConnell; Bracewell & Patterson (57) ABSTRACT

A system and method for freezing a processing unit to facilitate on-line debugging of a protocol engine within a switching node of a data transmission network. In accordance with the system of the present invention, the protocol engine includes a plurality of processing units such as an identification unit, a lookup unit, a traffic management and congestion unit, an enqueue unit, a dequeue unit, a traffic management scheduling unit, a frame transmission unit, a control unit, and a control block unit. The control block unit includes a freeze register containing multiple freeze bits, wherein each freeze bit is associated with one processing unit. In response to setting a freeze bit, resources and settings of a processing unit associated with the set freeze bit are prevented from being changed by the processing unit.

9 Claims, 7 Drawing Sheets

ON-LINE DEBUGGING SYSTEM IN A SWITCHING NODE OF A DATA TRANSMISSION NETWORK

BACKGROUND OF THE INVENTION

1. Technical Field

The invention relates generally to debugging switching nodes in a data transmission network, and in particular, to an on-line system and method for debugging a protocol engine of a switching node in a data transmission network.

2. Description of the Related Art

The extensive use of data transmission networks such as Asynchronous Transfer Mode (ATM) networks that operate at high speeds raises the problem of debugging the protocol engine within a switching node in an efficient manner in order to avoid loss of data through the protocol engine.

Past experience has demonstrated that debugging a protocol engine is very time consuming and thus may result in "field critical situations". A major reason for such a slow debugging process is the transparency of the causes of protocol engine failures resulting from limited observation access during real-time operation when failures occur.

Hardware analyzers are conventionally utilized for protocol engine debugging. The value in hardware analyzers in this context is limited by the fact that hardware analyzers only provide observation of external busses along with internal information that is routed to free output probes. Thus, the analyzer can detect the status of the signals within each component of a system at a specified test time. If, however, the bug is not revealed at this precise time, the analyzer is not able to detect the causes of the problem.

A possible solution to this problem is to recreate the bug utilizing the same original data on the same data paths. This solution, however, is time-consuming and is not always efficient since it requires the continued operation of the hardware during the analysis, resulting in instability and a lack of identical problem reproduction.

It would therefore be useful to provide a non-intrusive system and method for debugging a network switching node during real-time operations.

SUMMARY OF THE INVENTION

A system and method for freezing a processing unit to facilitate on-line debugging of a protocol engine within a switching node of a data transmission network are disclosed herein. In accordance with the system of the present invention, the protocol engine includes a plurality of processing units such as an identification unit, a lookup unit, a traffic management and congestion unit, an enqueue unit, a dequeue unit, a traffic management scheduling unit, a frame transmission unit, a control unit, and a control block unit. The control block unit includes a freeze register containing multiple freeze bits, wherein each freeze bit is associated with one processing unit. In response to setting a freeze bit, resources and settings of a processing unit associated with the set freeze bit are prevented from being changed by the processing unit.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or to scope of the present invention.

Figure 1:
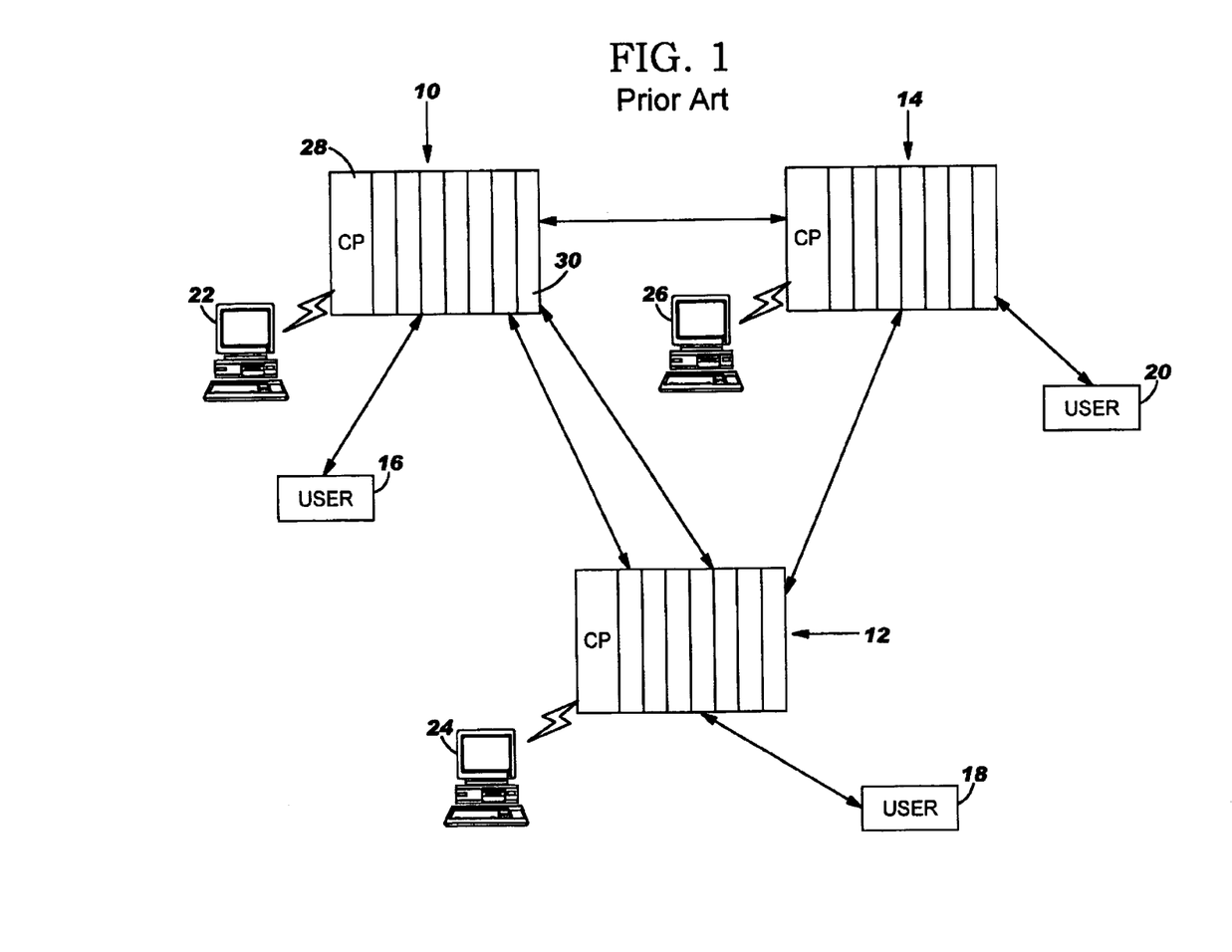
FIG. 1 is a block diagram illustrating a conventional ATM network in which the system and method of the present invention may be advantageously implemented.

With reference now to the figures wherein like reference numerals refer to like and corresponding parts throughout, and in particular with reference to FIG. 1, there is illustrated a conventional ATM network in which the system and method of the present invention may be implemented. As shown in FIG. 1, the ATM network includes switching nodes 10, 12 and 14 that are connected to users 16, 18 and 20, and to local consoles 22, 24 and 26, respectively.

Each switching node includes a Control Point (CP) blade such as CP blades 28 within switching node 10. Multiple adapter blades, such as adapter blade 30 in switching node 10 provide the physical attachments to network devices such as the other switching nodes or the user workstations. Each switching node also includes a switch fabric that provides cell switching between its ports to which the adapter blades are attached. Local consoles 22, 24, and 26 are each attached to the CP blade in each respective switching node and are utilized for network and control management.

Figure 2:
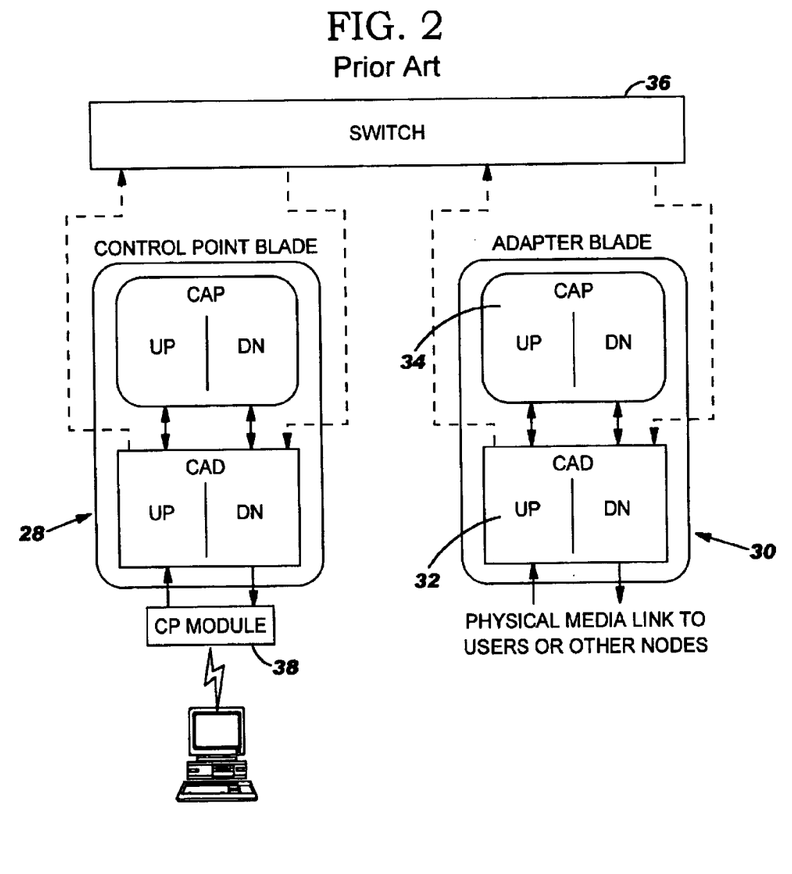
FIG. 2 is a block diagram depicting a conventional switching node in which a preferred embodiment of the present invention may be practiced.

With reference now to FIG. 2, there is illustrated a block diagram depicting a conventional switching node in which a preferred embodiment of the present invention may be practiced. Specifically, FIG. 2 illustrates the internal structure of each of switching nodes 10, 12, and 14. As shown in FIG. 2, each adapter blade 30 and CP blade 28 share the same flow structure.

Two application-specific integrated circuit (ASIC) modules are implemented within each of blades 28 and 30. One of these ASIC's is a Common ATM Data mover (CAD) module 32 that handles the data flow, and the other ASIC is a Common ATM Processor (CAP) module 34 that performs the necessary ATM processing. CAD module 32 is connected to switch 36.

Each of the ASIC modules 34 and 36, is divided into two parts—an UP side for the receive flow and a DN (down) side for the transmit flow. The UP side of CAD 32 receives data from physical network links and stores them in a data storage. For each cell received, a minimum information is exchanged with the UP side of CAP module 34 for ATM cell processing (virtual port (VP), virtual connection (VC) and cell buffer ID processing, for example). The UP side of CAP module 34 returns the information required to forward a cell through switch 36 via the UP side of CAD module 32. This forwarding information is retrieved from a control storage device within the UP side of CAP module 34. It should be noted that the UP and DN sides of CAP module 34 and CAD module 32 are blades through which ATM cells flow, and that switch 36 connects blades UP to blades DOWN and forwards the cells from an input port to an output port.

A CAD DN blade within CP blade 28 or adapter blade 30 receives data from switch 36 and stores the data in an appropriate data storage device. For each cell received within a CAD DN blade, a minimum information is exchanged with the CAP DN for the cell processing (VP, VC and cell buffer ID, for example). The CAP DN blade returns the information required to forward the cell to the correct destination port and ATM connection via the CAD DN blade.

CP blade 28 has the same processing structure as that in adapter blade 30. CP blade 28 is dedicated handling various types of control cells and also to handling internal control cells called guided cells. Such guided cells are emitted by a CP module 38 for the purposes of managing internal connections and parameters, setting connection parameters in the blades, and reading and writing to and from registers in those blades.

Figure 3:
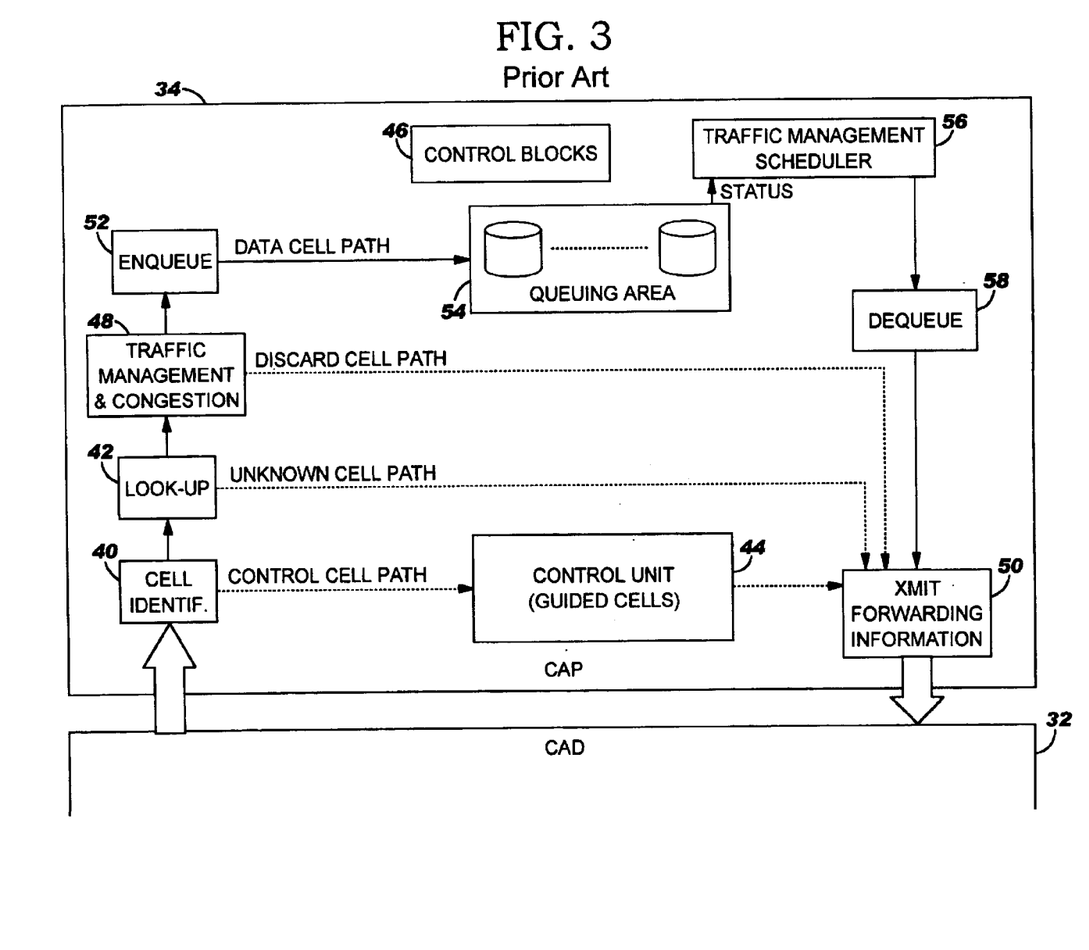
FIG. 3 is a block diagram illustrating a conventional protocol engine functionality within an adapter blade in a switching node in which a preferred embodiment of the present invention may be advantageously utilized.

Turning now to FIG. 3, there is depicted a block diagram illustrating a conventional protocol engine functionality in the form of processing units within an adapter blade in a switching node in which a preferred embodiment of the present invention may be advantageously utilized. Specifically, FIG. 3 shows the operational structure of CAP module 34.

Upon receipt of an ATM cell from CAD module 32, a cell identification unit 40, here an ATM label decoder, determines whether or not the cell is an ATM user cell, and in response to determining that it is, sends the cell to a lookup unit 42. If it is determined that the incoming cell is a guided cell from CP module 38, identification unit 40 delivers the guided cell to a control unit 44.

Lookup unit 42 resolves the ATM label (VP-VC) to identify the connection using Control Blocks 46 that are set by the CP module 38. If a cell is identified as belonging to a known connection, it is sent to a Traffic Management and Congestion Unit 48. If not, it is sent to a Xmit Forwarding Information unit 50 to be discarded.

Traffic Management and Congestion unit 48 classifies the cell according to its class of service as found in Control Blocks 46 and also in accordance with the congestion level found in the target queue. This process also includes admission control. The cell is forwarded to an enqueue unit 52 provided that a congestion level limit has not been reached and also provided that the network policy parameters are not violated. Otherwise, when the congestion level limit has been reached, or when one of the policy parameters has been violated, the cell is delivered to Xmit Forwarding Information unit 50 to be discarded.

Upon receipt of a cell, enqueue unit 52 enqueues the cell in the appropriate queue of a queuing area 54 in accordance with a cell address pointer. It should be noted that queuing area 54 contains the cell buffer address pointers which have been queued until a dequeue occurs.

As further depicted in FIG. 3, CAP module 34 further includes a Traffic Management Scheduler 56 that selects the queue from which a cell must be transmitted according to the queue priorities (different qualities of service are provided). The identity of the selected queue is then sent to a dequeue unit 58. Scheduler 56 is activated by a status indicator provided by queuing area 54 (at least one cell in the queue).

Dequeue unit 58 dequeues a cell from the scheduled queue and provides the forwarding information retrieved from Control Blocks 46 (destination port, label out). The cell is then delivered to Xmit Forwarding Information unit 50 which feeds cells to CAD module 32 to be transmitted or discarded.

Control unit 44 (guided cells) performs operations such as reading or writing from or to Control Blocks 46 and hardware registers, as requested by CP module 38. Guided cells that are utilized for reading are the "guided read cells" (GRC), while the guided cells which are utilized for writing are "guided write cells" (GWC).

It should be noted that Control Blocks 46 reside in the storage media of CAP module 34 (external or internal), and contain different types of control blocks as lookup resolution tables, connection parameters, queue parameters, etc. Control Blocks 46 are set and updated by GWCs from control unit 44. Additional processing units within CAP module 34 can also update Control Blocks 46.

One or more of the processing units of the protocol engine CAP 34 represented in FIG. 3 can be "frozen" in accordance with the debugging method of the present invention. As utilized herein, "freezing" of a processing unit refers to the object processing unit being paralyzed and placed in a static condition in which all operating conditions and settings for the frozen unit are kept unchanged. Thus, an incoming flow of cells that is received by a frozen processing unit is delivered unprocessed as an output flow from the processing unit, and is sent without being processed in such a way that no conditional or setting changes have occurred. In this manner, if lookup unit 42 and/or Traffic Management and Congestion unit 48 are frozen, the output cells are delivered to Xmit Forwarding Information unit 50 to be discarded.

Figure 4:
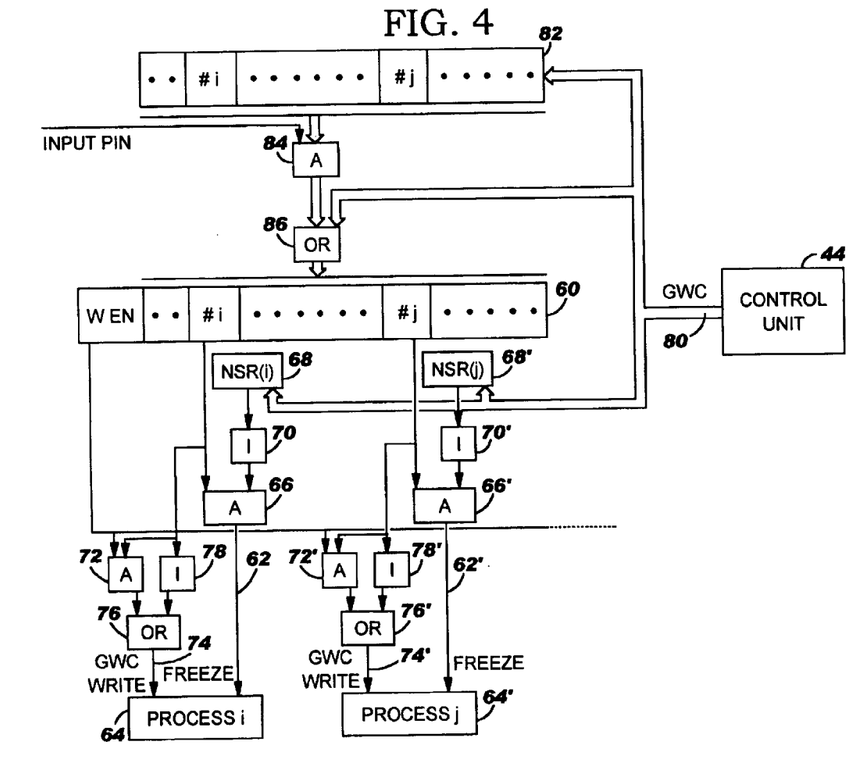
FIG. 4 is a block diagram depicting a debugging system in accordance with a preferred embodiment of the present invention.

With reference now to FIG. 4, there is illustrated a block diagram depicting a debugging system in accordance with a preferred embodiment of the present invention. In an important feature of the debugging system of the present invention, a freeze register 60 contains a number of bits that are each associated with a processing unit of the protocol engine (CAP module 34).

Each of the bits within freeze register 60 is set to 1 when its associated unit is frozen. Assuming that a freeze bit for the process executed by a processing unit i is set to 1, a freeze signal is supplied over line 62 to process i 64. An AND circuit 66 supplies the freeze signal when the contents of a Number Shot Register (NSR)(i) 68 associated with freeze bit i (of register 60) are zero, and therefore the output of an inverter 70 is 1. NSR (i) 68 can be loaded by GWCs (guided cells) from control unit 44 with a number n representing the number of times the process i has to be executed before being frozen. Therefore, as long as the contents of NSR (i) are not 0, a 0-bit is provided by inverter 70 and freeze line 62 is not set to 1.

Freeze register 60 further includes a WRITE ENABLE (W EN) bit that is used for controlling write operations of control unit 44 utilizing GWCs. When, for a given process i, the freeze bit # i in freeze register 60 is set to 1, a write operation from control unit 44 to process i is enabled only if bit W EN is set to 1. Such a write is enabled in accordance with two inputs of an AND circuit 72 being set to 1 (freeze bit i and W EN), which provides a signal asserted to a binary 1 on GWC WRITE line 74. This asserted signal is provided at the output of OR circuit 76. It should be noted that the other input of OR circuit 76 is the output of inverter 78 which provides a 1-bit when freeze bit #i of register 60 is set to 0. When such conditions are fulfilled, the process corresponding to unit i is not frozen and the resources associated with unit i may be changed. Conversely, the hardware state and the resources of unit i are maintained in a static condition when freeze bit #i is set to 1 and the W EN bit is set to 0. It should be noted that the above description relating to unit i also applies to unit j for which all corresponding reference numbers are denoted with a prime "'".

The contents of freeze register 60 may be changed either by GWCs sent on bus 80 or through an external triggering (INPUT PIN). The latter case is enabled by the use of a mask register 82 that includes a number of bits associated with the units authorized to be frozen. With the exception of the W EN bit, the bit locations of mask register 82 correspond exactly to the bit locations of freeze register 60. That is, bit locations #i and #j of mask register 82 correspond to processing units i and j respectively. The bit locations within mask register 82 are loaded by GWCs from control unit 44 on bus 80. Assuming that INPUT PIN is externally activated, the contents of mask register 82 are transferred into freeze register 60 through AND circuit 84 and OR circuit 86. When freeze register 60 is not loaded with the contents of mask register 82, it is loaded directly by GWCs (through OR circuit 86) as already mentioned.

Figure 5:
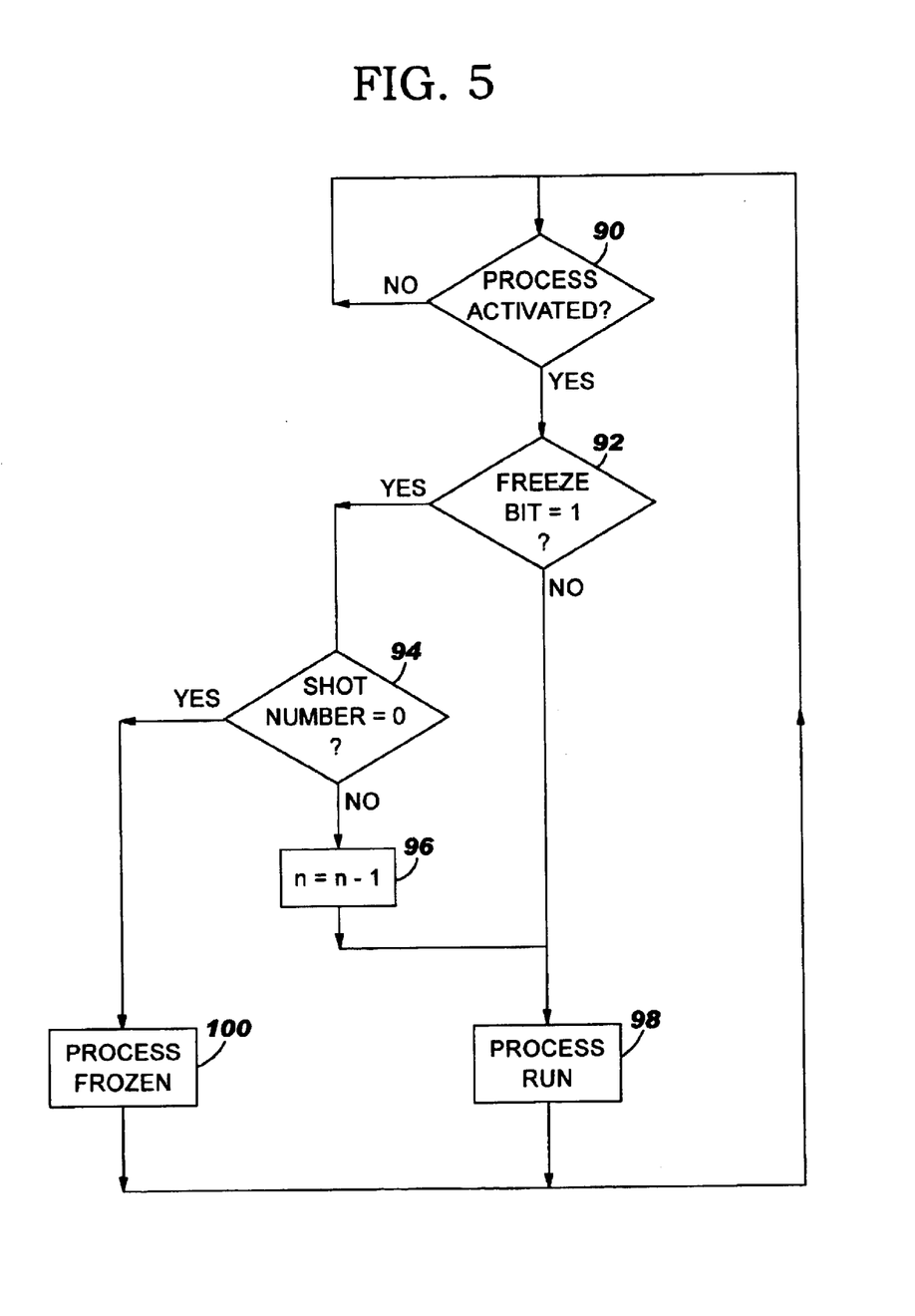
FIG. 5 is a flow diagram illustrating process steps performed within a processing unit during on-line debugging of a protocol engine in accordance with a preferred embodiment of the present invention.

In a general way, the execution of a process by a unit of a protocol engine such as CAP module 34 is depicted as a series of steps in the flow diagram illustrated in FIG. 5. First, a continuous check is performed (step 90) to determine whether or not a given process (associated with a processing unit as described with reference to FIG. 3) is activated. If so, and as illustrated at inquiry step 92, a determination is made of whether or not a freeze bit associated with the object processing unit is set to 1.

If it is determined at step 92 that the freeze bit is set to 1, another test performed as depicted at step 94 to determine whether or not a corresponding NSR register (described with reference to FIG. 4) contains a non-zero shot number n. If a non-zero shot number is determined at step 94, and as illustrated at step 96, the shot number is decremented to n−1 and the process associated with the object processing module is permitted to continue operating (step 98). The process is also run if at step 92 it is determined that the freeze bit is set to 0. When the freeze bit is set to 1 and shot number is set to 0 in NSR register 68, the object processing unit is disabled from continued cell processing and the process is frozen as shown at step 100.

Figure 6:
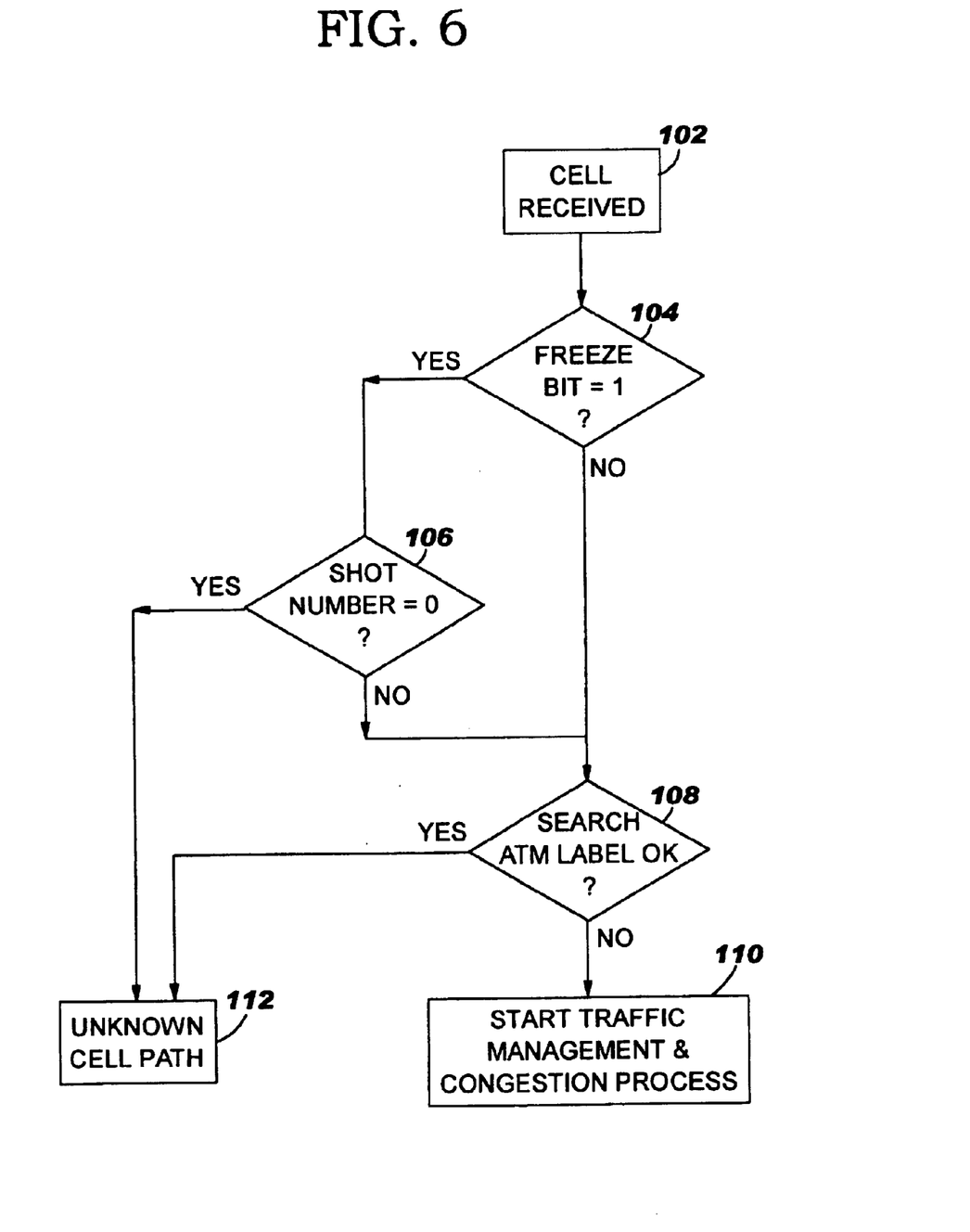
FIG. 6 is a flow diagram depicting process steps performed within a lookup unit during on-line debugging of a protocol engine in accordance with a preferred embodiment of the present invention.

Turning now to FIG. 6, there is illustrated a flow diagram depicting process steps performed within a lookup unit during on-line debugging of a protocol engine in accordance with a preferred embodiment of the present invention. The flow diagram of FIG. 6 thus provides an example of the processing unit disablement procedure of FIG. 5 as applied to the process executed by lookup unit 42 of FIG. 3.

The process begins as illustrated at step 102 with the lookup unit receiving an ATM cell. Next, as shown at step 104, a test is performed to determine whether or not the freeze bit associated with the lookup unit is set to 1. If so, the contents of NSR register 68 are examined to determine whether or not this value is 0 or not (step 106). If the value in NSR register 68 is not 0, and as depicted at step 108, the process associated with the lookup unit, an ATM label search, is performed in the lookup table.

It should be noted that the ATM label search also occurs if the freeze bit is not set to 1 since, in such a case, the lookup unit is not frozen. If the ATM label search is positive (meaning that the required ATM connection exists as defined in the switching node), and as depicted at step 110, the process executed by the Traffic Management and Congestion unit can commence. Otherwise, as shown at step 112, if the ATM label search is negative (meaning that the required ATM connection is unknown), the cell is transmitted to the Xmit Forwarding Information unit to be discarded. As further illustrated in FIG. 6, if the freeze bit is set 1 at step 104 and the value of the NSR register is 0 at step 106, the normal lookup process is not performed and the cell is transmitted to the Xmit Forwarding Information unit to be discarded (step 112) as if the connection was unknown in the switching node.

Figure 7:
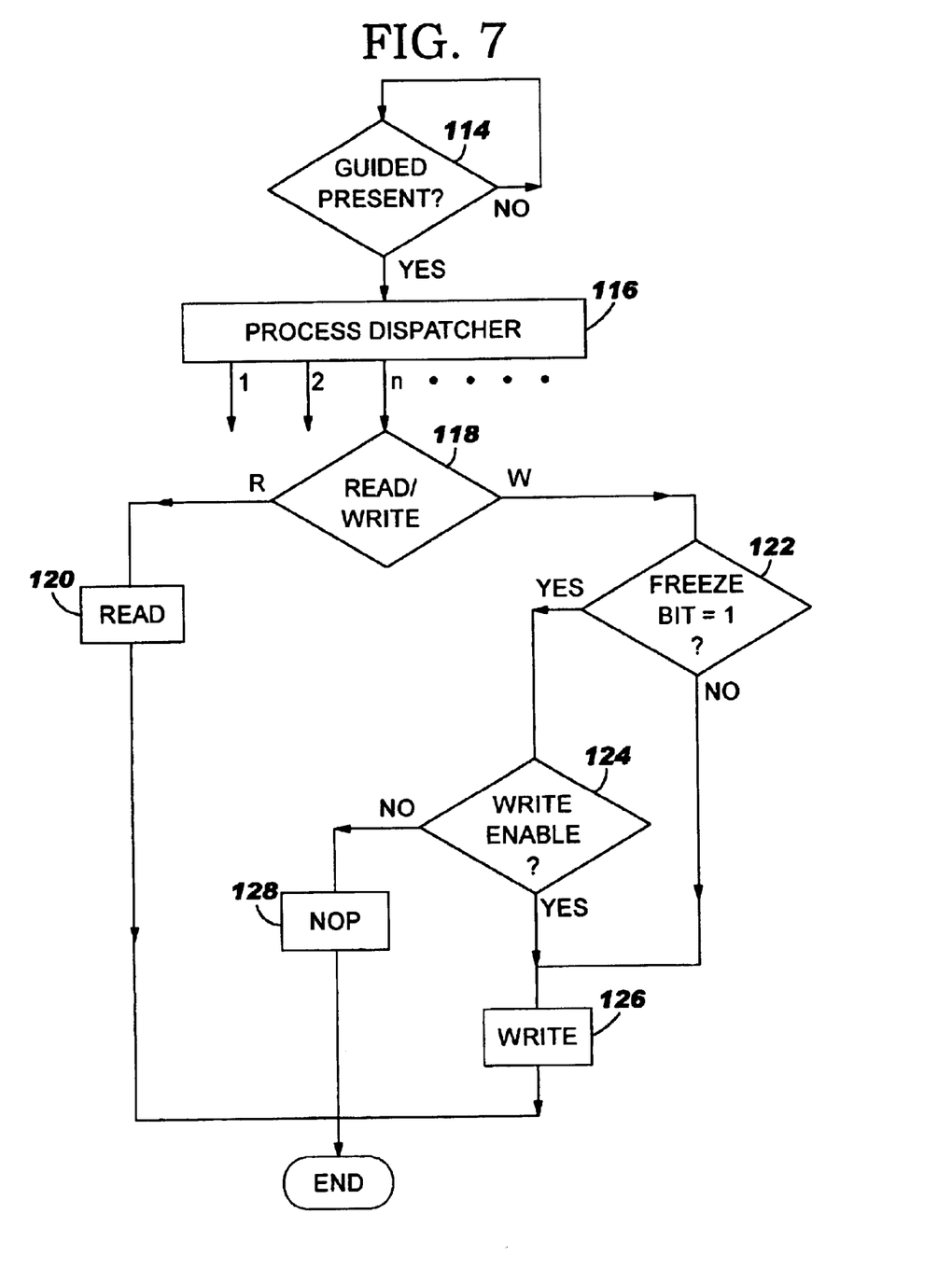
FIG. 7 is a flow diagram illustrating the process steps performed within a control unit during on-line debugging of a protocol engine in accordance with a preferred embodiment of the present invention.

With reference now to FIG. 7, there is depicted a flow diagram illustrating the process steps performed within a control unit during on-line debugging of a protocol engine in accordance with a preferred embodiment of the present invention. Specifically, FIG. 7 illustrates the process executed by control unit 44 utilizing guided cells.

The read/write process is not started until guided cells have been received by control unit 44 from CP module 38. Accordingly, continuous test is performed to detect the presence of guided cells as shown at step 114. If guided cells are present (have been delivered by CP 38), then as illustrated at step 116, a process dispatcher sends the guided cells to the appropriate processing unit. Inquiry step 118 depicts a determination of whether or not the guided cells are GRCs or GWCs.

If it is determined at step 118 the guided cells are GRCs, a read operation is executed as illustrated at step 120. If, however, the guided cells are determined to be GWCs, a determination is made of whether or not the freeze bit for the object processing unit is set to 1 (step 122). If the freeze bit is set to 1, and as depicted at step 124, a WRITE ENABLE bit within the freeze register is checked. If the WRITE ENABLE bit is set to 1, the write operation proceeds normally as shown at step 126. It should be noted that the write operation illustrated at step 126 also proceeds in response to the freeze bit being set to 0 since, in such a case, the object processing unit is not frozen. If the WRITE ENABLE bit is not set to 1, all processing operations within the object processing unit are terminated as illustrated at step 128.

The implementation of the system as described above permits access to the resources and settings by means of read operations initiated by the control point of the switching node. This on-line access is required for understanding the causes of an erroneous operation performed by a processing unit.

While the invention has been particularly shown and described with reference to a preferred embodiment, it will be understood by those skilled in the art that various changes in form and detail may be made therein without departing from the spirit and scope of the invention.

What is claimed is:

1. Apparatus comprising:
   a protocol engine within a switching node of a data transmission network, said protocol engine including a plurality of processing units and a control unit for updating a freeze register utilizing guided write cells delivered to said control unit;
   a freeze register having a plurality of freeze bits, each of said freeze bits being individually associated with one of said plurality of processing units, and wherein in response to setting a freeze bit, resources and settings of a processing unit associated with said set freeze bit are prevented from being changed by said processing unit; and
   a number shot register associated with each of said freeze bits, wherein a set freeze bit for a processing unit is overridden in response to a non-zero value in said shot register such that a process implemented by said processing unit s enabled even if said associated freeze bit is set to 1, and wherein said number shot register value is decremented each time said process is executed.

2. The apparatus of claim 1, wherein said freeze register is included in said control unit within said protocol engine.

3. The apparatus of claim 1, wherein said freeze bits within said freeze register are set in accordance with said guided write cells delivered by said control unit.

4. The apparatus of claim 1, wherein said plurality of processing units are characterized as belonging to a group comprising: an identification unit, a lookup unit, a traffic management and congestion unit, an enqueue unit, a dequeue unit, a traffic management scheduling unit, and a frame transmission unit.

5. The apparatus of claim 1, wherein said value of said number shot register is loaded by guided write cells delivered by said control unit.

6. The apparatus of claim 1, wherein said freeze register further comprises a write enable bit that, when set to one, enables the resources and settings of a processing unit in response to a freeze bit associated with said processing unit being set.

7. Apparatus comprising
   a protocol engine within a switching node of a data transmission network, said protocol engine including a plurality of processing units and a control unit for updating a freeze register utilizing guided write cells delivered to said control unit;
   a freeze register having a plurality of freeze bits, each of said freeze bits being individually associated with one of said plurality of processing units, and wherein in response to setting a freeze bit, resources and settings of a processing unit associated with said set freeze bit are prevented from being changed by said processing unit; and
   a mask register that includes bit locations corresponding to non-write enable bits locations within said freeze register, wherein contents of said mask register are loaded into said freeze register in response to activation of an external input pin.

8. The apparatus of claim 7, wherein said contents of said mask register are loaded by guided write calls delivered by said control unit.

9. A method comprising:
   determining whether a bit in a freeze register associated with a processing unit is set to one:
   determining whether a value contained in a number shot register associated with said freeze register bit is equal to zero;
   in response to determining that said bit is set to 1 and said number shot register value is equal to zero, freezing said processing unit by halting changes to a hardware state and resources of said processing unit:
   in response to determining that said number shot register value is not zero, executing a process implemented by said processing unit a number of times, wherein said number is determined by said number shot register value; and
   decrementing said number shot register value at each execution until said value is equal to zero.

* * * * *